United States Patent
Iwaguchi et al.

(10) Patent No.: US 6,249,874 B1
(45) Date of Patent: Jun. 19, 2001

(54) INFORMATION PROCESSING DEVICE

(75) Inventors: Isao Iwaguchi; Shinichi Satoh; Hiroaki Kawai; Mitsuo Watanabe; Motohiko Itoh, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/947,158

(22) Filed: Oct. 8, 1997

(30) Foreign Application Priority Data

Mar. 14, 1997 (JP) ..................................... 9-061236

(51) Int. Cl.$^7$ ....................................... G06F 1/26
(52) U.S. Cl. ............................................. 713/300
(58) Field of Search ............................. 713/300; 740/100, 740/126, 131

(56) References Cited

U.S. PATENT DOCUMENTS

| | | |
|---|---|---|
| 4,760,035 * | 7/1988 | Pfleiderer et al. ..................... 437/57 |
| 4,760,433 * | 7/1988 | Young et al. ....................... 357/23.13 |
| 5,561,312 * | 10/1996 | Nozoe et al. ........................... 257/357 |
| 5,670,799 * | 9/1997 | Croft ..................................... 257/173 |
| 5,680,625 * | 10/1997 | Sekine et al. ......................... 713/330 |
| 5,717,430 * | 2/1998 | Copland et al. ...................... 345/168 |
| 5,723,853 * | 3/1998 | Longacre, Jr. et al. ............. 235/472 |
| 5,787,298 * | 7/1998 | Broedner et al. .................... 713/323 |
| 5,854,945 * | 12/1998 | Criscito et al. ......................... 710/62 |
| 5,944,831 * | 8/1999 | Pate et al. ............................. 713/324 |

* cited by examiner

Primary Examiner—David Wiley
(74) Attorney, Agent, or Firm—Armstrong, Westerman, Hattori, McLeland & Naughton, LLP

(57) ABSTRACT

An information processing device connectable to another device via a transmission line includes an interface circuit connected to the transmission line, and a circuit which sends a signal to the transmission line and receive a signal from the transmission line. The interface circuit is supplied with electricity from the above another device. The above circuit is supplied with electricity from an external power source connected to the information processing device.

6 Claims, 8 Drawing Sheets

INFORMATION PROCESSING DEVICE

BACKGROUND OF THE INVENTION

1. Field of the Invention

The present invention generally relates to an information processing device, and more particularly to an information processing device which is connected to an interface system such as a keyboard interface system and is supplied with power from an upper device to which the interface system is connected and power from an external power source.

In the present specification, a description will mainly be given of a bar code reader connected to a keyboard interface. However, the present invention is not limited to such a bar code reader but includes an information processing device which has a plurality of power supply systems and communicate with a device connected to the information processing device.

2. Description of the Related Art

A system having a bar code reader connected to a personal computer has been widely used to input information represented by a bar code. A bar code reader of so-called touch type is known.

Generally, the bar code reader performs a bar code read operation in which a light is projected onto a bar code and part of the light reflected by the bar code is received. The touch-type bar code reader is equipped with a light-emitting device (LED) as a light source and a two-dimensional CCD (Charge-Coupled Device) serving as a light-receiving element. The operator brings a read window of the touch-type bar code reader into contact with the bar code to be read. Hence, the bar code is illuminated by the light emitted from the LED, and the light reflected by the bar code is received by the CCD, so that information represented by the bar code can be read.

The touch-type bar code reader has a simple, light, easily operable, and less-expensive structure because it does not have any mechanism for deflecting the light for scanning. Further, the touch-type bar code reader does not have any demodulator which demodulates read bar code data and any mechanism which mechanically drives a component. Thus, the touch-type bar code reader has been widely used due to the above advantages thereof.

FIG. 1 is a block diagram of a system structure having such a bar code reader connected between a personal computer and a keyboard. Particularly, FIG. 1 is a part of the system structure shown in FIG. 1, the above part being involved with a signal transmit/receive and a power supply. The system shown in FIG. 1 includes a personal computer 11, a keyboard 12, and a bar code reader 13, which are respectively equipped with controllers 11a, 12a and 13a for controlling the respective operations thereof.

The personal computer 11, the bar code reader 13 and the keyboard 12 are connected through an interface cable 14, which includes a transmission line 14b and a power supply line 14a. The transmission line 14b of the interface cable 14 is used to transmit and receive data, and the power supply line 14a thereof is used to supply electricity to the keyboard 12 from the personal computer 11.

The controllers 11a, 12a and 13a have respective input and output terminals to which the transmission line 14b of the interface cable 14 is connected. Drivers are provided to the output terminals of the controllers 11a, 12a and 13a.

Electricity for operating the keyboard 12 is supplied from the personal computer 11 via the power supply line 14a. The power supply voltage is denoted by $V_{PC}$. The touch-type bar code reader 13 consumes a small amount of power. Hence, in the system shown in FIG. 1, the power supply voltage $V_{PC}$ of the personal computer 11 is applied to the bar code reader 13 as well as the keyboard 12 so that electricity for operating the bar code reader 13 is supplied from the personal computer 11 via the power supply line 14a.

A signal which is input when a key of the keyboard 12 is operated or depressed and bar code data input by the bar code reader 13 are transmitted to the personal computer 11 over the transmission line 14b. An instruction can also be transmitted to the keyboard 12 and the bar code reader 13 via the transmission line 14b.

Recently, there has been a demand to efficiently execute the bar code input process of the bar code reader. An advanced bar code reader having high performance is known in which it employs a scanner such as a polygon mirror. The scanner is driven or rotated by a stepping motor which serves as a driving source. The polygon mirror has mirror surfaces by which a light beam emitted from a light source such as a laser diode is reflected so that the bar code is scanned.

In the touch-type bar code reader, the demodulation process for the read bar code data is processed by an upper computer such as a personal computer. However, in this case, the personal computer has an increased load of processing. In order to reduce the load of the personal computer, a modified touch-type bar code reader has been proposed which is equipped with the demodulation circuit which demodulates the bar code data. In this case, the personal computer does not execute the demodulation process.

As the performance of the bar code reader is improved, an increased amount of electricity is consumed therein. The structure shown in FIG. 1 increases the load of the power source of the personal computer 11 because the bar code reader 13 is supplied with electricity from the personal computer 11. In some cases, a sufficient amount of energy to drive the bar code reader 13 cannot be supplied thereto.

In order to avoid the above problem, an external power source is provided separately from the power source of the personal computer 11. The external power source is externally provided to and connected to the bar code reader 13. An AC adapter is an example of such an external power source.

However, another problem will occur when such an external power source is provided. Generally, electronic devices such as bar code readers and personal computers employ CMOS (Complementary Metal Oxide Semiconductor) circuits because the CMOS circuits consume a relatively small amount of energy. As is well know, the CMOS circuits has a problem so-called "latch up".

FIG. 2 is a circuit diagram of a CMOS circuit, which includes an n-type MOS transistor and a p-type MOS transistor, the drains of which transistors are connected together. A power supply voltage $V_{DD}$ is applied to the CMOS circuit. A symbol $V_{IN}$ denotes an input signal, and a symbol $V_{OUT}$ denotes an output signal. The CMOS circuit shown in FIG. 2 functions as an inverter, which consumes a relatively small amount of energy and is thus used widely.

The latch-up occurs in the CMOS circuit shown in FIG. 2 if the voltage of the input signal $V_{IN}$ is greater than the power supply voltage $V_{DD}$.

FIG. 3 is a cross-sectional view of the CMOS circuit shown in FIG. 2. A parasitic p-n-p bipolar transistor $\alpha_1$ and a parasitic n-p-n bipolar transistor $\alpha_2$ are formed, as indicated by the broken line in FIG. 3. The above two parasitic bipolar transistors connected in the way indicated by the broken lines form a thyristor. If the thyristor starts to operate, a current continuously flows from the power supply $V_{DD}$ to the ground. This phenomenon is called latch-up. In order to release the circuit from the latch-up state, it is necessary to turn of the power supply voltage $V_{DD}$. In some cases, an excessive current flows due to the latch-up, and the circuit may be broken.

The latch-up causes the following problem in a state in which electricity is supplied to either the personal computer 11 or the bar code reader 12 only a signal is transferred over the transmission line 14b. In this-state, the latch-up occurs in a CMOS circuit provided in the device supplied with no electricity. The above problem will be described with reference to FIG. 4, in which parts that are the same as those shown in FIG. 1 are given the same reference numbers.

Referring to FIG. 4, electricity is supplied to the personal computer 11, while no electricity is supplied to the bar code reader 13. In this case, no voltage is supplied from an AC adapter 15, so that a voltage of 0 V is supplied to the controller 13a. When a signal having a high level of +5 V is output to the transmission line 14b from the personal computer 11. In this case, a voltage of +5 V is applied to the input terminal of the controller 13a. Hence, the voltage applied to the input terminal of the controller 13a is higher than the power supply voltage applied thereto. This causes the latch-up in a CMOS circuit in the controller 13a.

The latch-up will not frequently occur in the configuration shown in FIG. 1 because the bar code reader 13 is supplied with electricity from the personal computer 11. Hence, when the $V_{PC}$ power supply ON/OFF states of the personal computer 11 and the bar code reader 13 cooperate with each other. However, as has been described previously, the configuration shown in FIG. 1 has a problem in terms of power capacity. Hence, in practice, the configuration shown in FIG. 1 will not be employed. Hence, it is required to avoid the latch-up in a system having two power supply systems as shown in FIG. 4.

SUMMARY OF THE INVENTION

It is a general object of the present invention to provide an information processing device in which the above problems are eliminated.

A more specific object of the present invention is to provide an information processing device such as a bar code reader designed to avoid the latch-up irrespective of use of a plurality of power supply systems.

The above objects of the present invention are achieved by an information processing device connectable to another device via a transmission line, the information processing device comprising: an interface circuit connected to the transmission line; and a circuit which sends a signal to the transmission line and receive a signal from the transmission line, the interface circuit being supplied with electricity from the above another device, the circuit being supplied with electricity from an external power source connected to the information processing device.

The above information processing device may further comprise a protection circuit provided between a power supply line via which the electricity is supplied to the circuit from the external power source and the transmission line.

The information processing device may be configured so that the protection circuit comprises an element which conducts in a first direction from the transmission line to the power supply line and which does not conduct in a second direction from the power supply line to the transmission line.

The above information processing device may be configured so that the interface circuit includes an analog switch.

The above objects of the present invention are also achieved by an information processing device connectable to another device via a transmission line, the information processing device comprising: a circuit which sends a signal to the transmission line and receive a signal from the transmission line, the circuit being supplied with electricity from an external power source connected to the information processing device; and a protection circuit provided between a power supply line via which the electricity is supplied to the circuit from the external power source and the transmission line, wherein the protection circuit conducts in a first direction from the transmission line to the power supply line and which does not conduct in a second direction from the power supply line to the transmission line.

Another object of the present invention is to provide a system comprising: a first device; and a second device which communicates with the first device via a transmission line, the first device comprising: an interface circuit connected to the transmission line; and a circuit which sends a signal to the transmission line and receive a signal from the transmission line, the interface circuit being supplied with electricity from the second device, the circuit being supplied with electricity from an external power source connected to the first device.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 1:
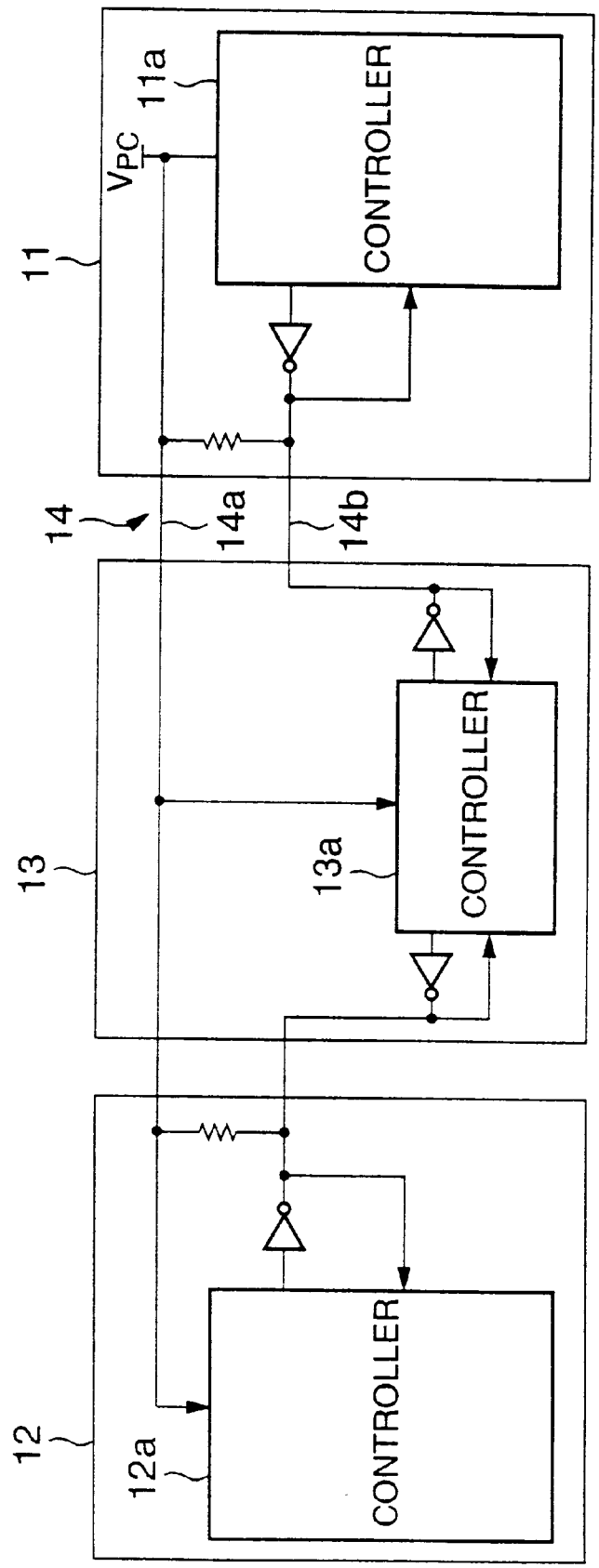
FIG. 1 is a block diagram of a conventional system which employs a single power supply system.
Figure 2:
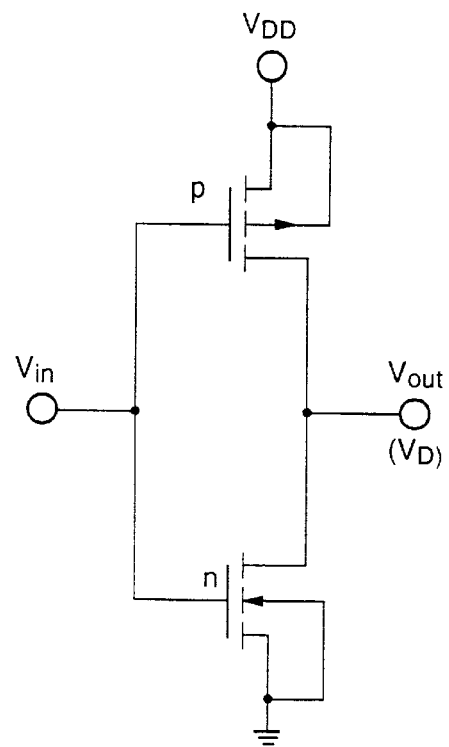
FIG. 2 is a circuit diagram of a CMOS circuit.
Figure 3:
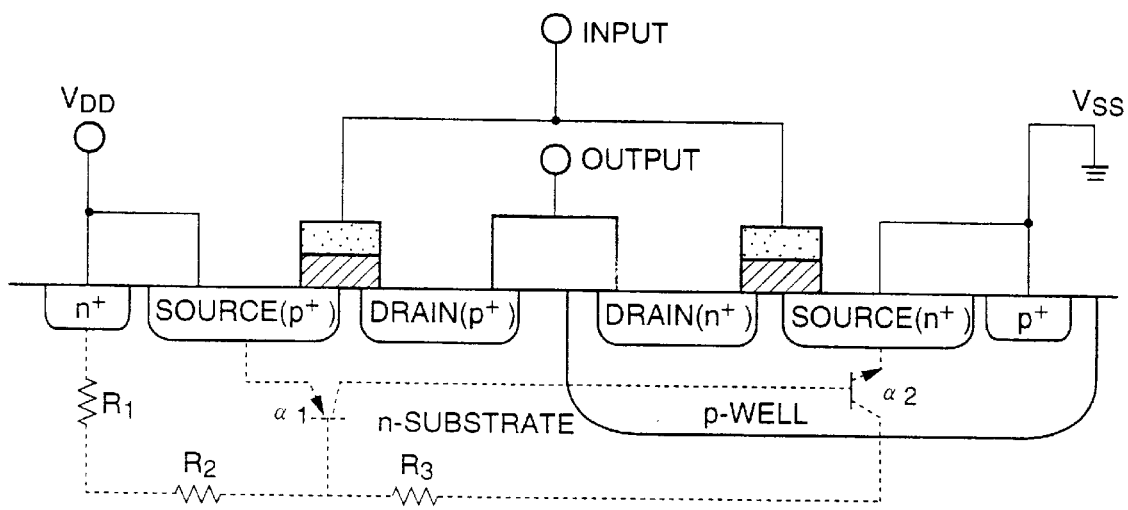
FIG. 3 is a cross-sectional view of the CMOS circuit shown in FIG. 2.
Figure 4:
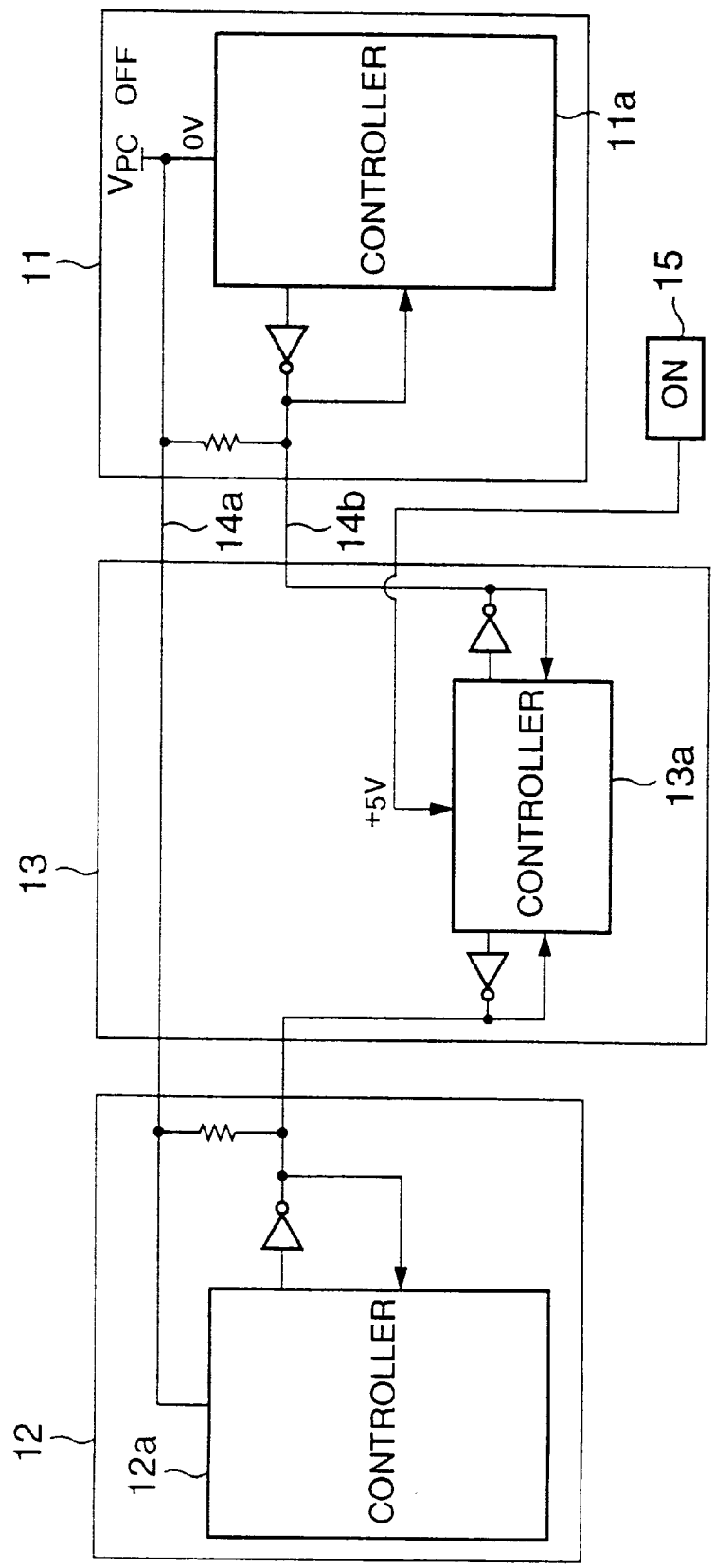
FIG. 4 is a block diagram of a conventional system which employs two power supply systems.
Figure 5:
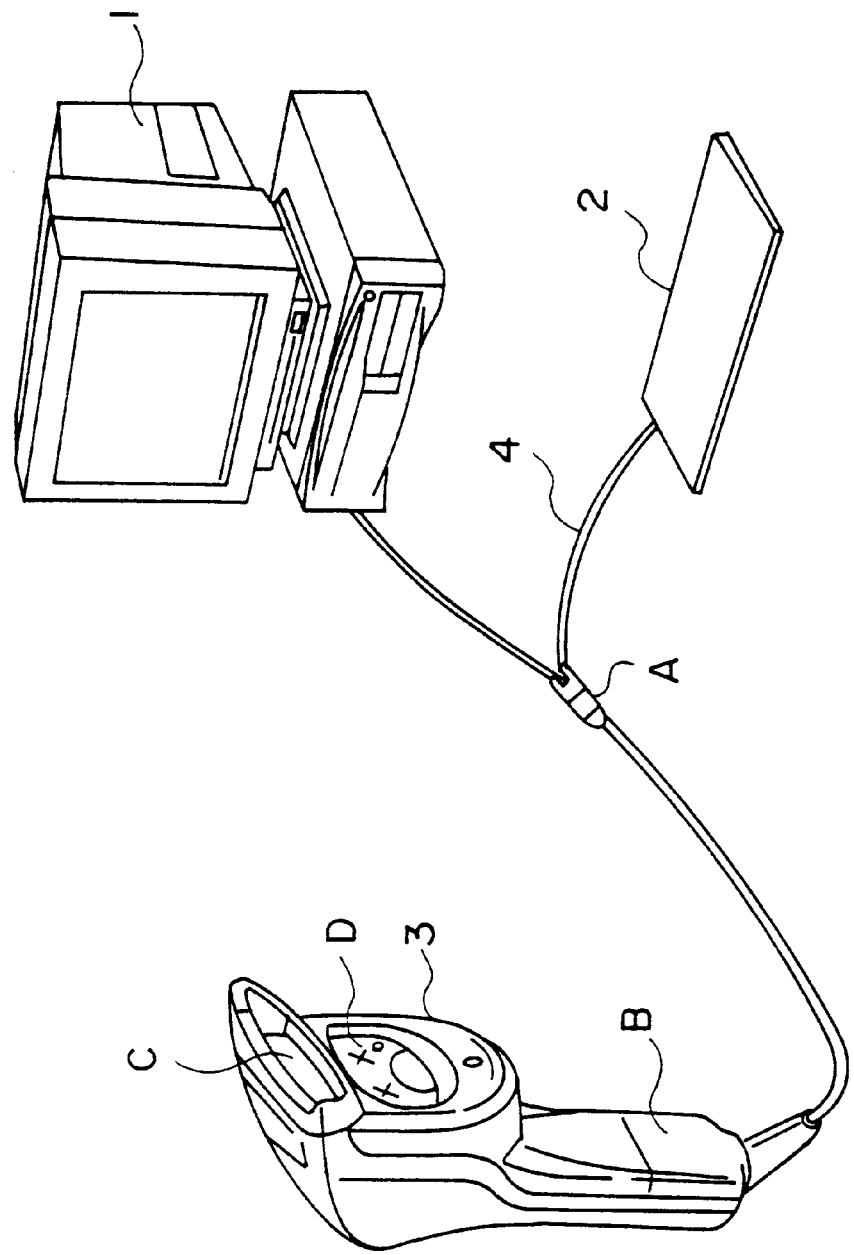
FIG. 5 is a perspective view of a system including an information processing device according to an embodiment of the present invention.

FIG. 5 is a perspective view of a system including an information processing device according to an embodiment of the present invention. The information processing device shown in FIG. 5 corresponds to a bar code reader 3. The system having the bar code reader 3 includes a personal computer 1 and a keyboard 2 connected thereto via an interface cable 4. The interface cable 4 has a branch portion A to which the bar code reader 3 is electrically connected.

The bar code reader 3 has a gripped portion B. The operator grips the gripped portion 3 and faces a first read window C of the bar code reader 3 to a bar code to be read. In this case, the bar code reader 3 is used as the touch-type bar code reader.

It is also possible to set the gripped portion B to a bar code reader stand. Hence, the bar code reader 3 can be placed on a desk or counter. In this case, the operator passes a product with the bar code attached thereto in front of a second read window D. That is, the bar coder reader 3 is capable of reading the bar code in the two different manners.

A laser diode serving as a light source is provided in the bar code reader 3. Further, a scanning mechanism for deflecting the laser beam emitted from the laser diode is also provided in the bar code reader 3 in order to optically scan the bar code. The scanning mechanism includes a polygon mirror or galvanomirror. If the scanning mechanism includes a polygon mirror, it is driven by a stepping motor provided in the bar code reader 3. The polygon mirror has a plurality of mirror surfaces by which the laser beam from the laser diode is reflected so that the scanning beam is formed.

Further, the bar code reader 3 includes a light-receiving element such as a photodiode and a demodulation circuit. The light-receiving element receives the reflected light from the bar code. The demodulation circuit performs a bar code demodulation operation on an output signal of the light-receiving element.

An AC adapter is externally connected to the bar code reader 3 in order to supply components thereof with electricity.

Electricity used to operate the keyboard 2 is supplied from the personal computer 1 via the interface cable 4.

Figure 6:
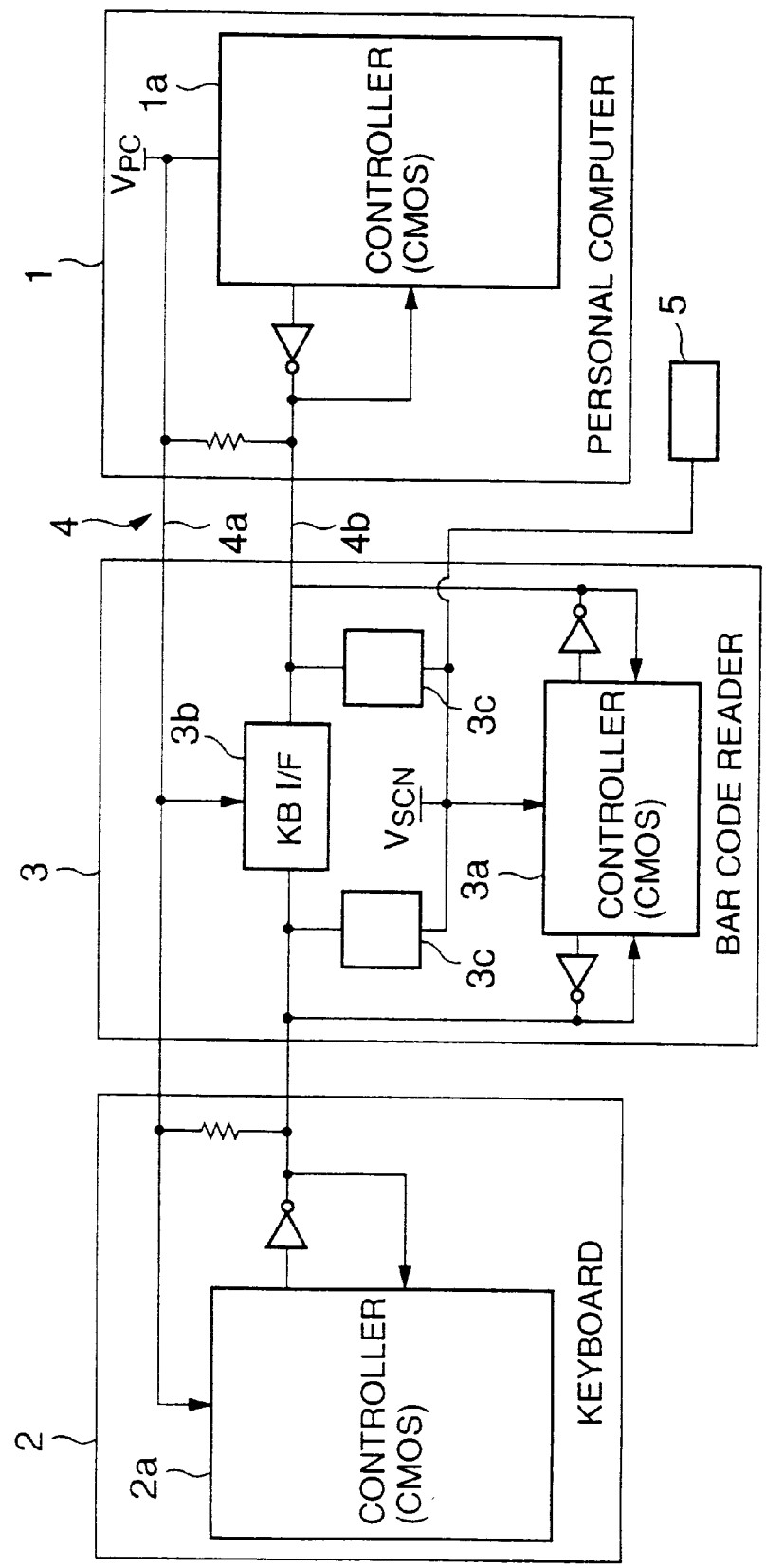
FIG. 6 is a block diagram showing an internal structure of the system shown in FIG. 5.

FIG. 6 is a block diagram of components of the keyboard 2, the personal computer 1 and the bar code reader 3, these components being involved with a data transmit/receive operation and a power supply operation. The interface cable 4 includes a power supply line 4a and a signal line 4b.

The personal computer 1 includes a controller 1a, which controls the whole operation of the personal computer 1. The controller 1a is formed by an integrated circuit such as a CMOS IC (Integrated Circuit) chip. Similarly, the keyboard 2 includes a controller 2a, which controls the whole operation of the keyboard 2. The controller 2a can be formed by a CMOS IC chip. The bar code reader 3 has a controller 3a, which controls the whole operation of the bar code reader 3. The controller 3a can be formed by a CMOS IC chip.

The CMOS IC chips are widely used due to a performance in which the CMOS IC chips can operate relatively stably even if a variation in the power supply voltage occurs.

The controllers 1a, 2a and 3a are connected to the signal line 4b of the interface cable 4. The controllers 1a, 2a and 3a have respective output terminals to which drivers are connected.

The AC adapter 5 is connected to the bar code reader 3 as an external power source. Electricity $V_{SCN}$ is supplied to the controller 3a of the bar code reader 3 from the AC adapter 5 via a power supply line 3d. The laser diode and the stepping motor (not shown) provided in the bar code reader 3 are supplied with the electricity from the AC adapter 5.

A power supply voltage V is applied to the controller 1a of the personal computer 1, and is also applied to the keyboard 2 via the power supply line 4a of the interface cable 4. The keyboard 2 can operate with the electricity from the personal computer 1.

A keyboard interface circuit (KB I/F) 3b is provided in the bar code reader 3. The keyboard interface circuit 3b is connected to the signal line 4b of the interface cable 4b, and performs a switching operation on a signal transmit/receive process via the interface cable 4. The keyboard interface circuit 3b is further connected to the power supply line 4a of the interface cable 4, and is supplied with the power supply voltage $V_{PC}$. Hence, the electricity for the keyboard interface circuit 3b is supplied from the personal computer 1.

The configuration of the information processing device shown in FIGS. 5 and 6 has the function of preventing the occurrence of the latch-up. This function will now be described in detail.

Figure 7:
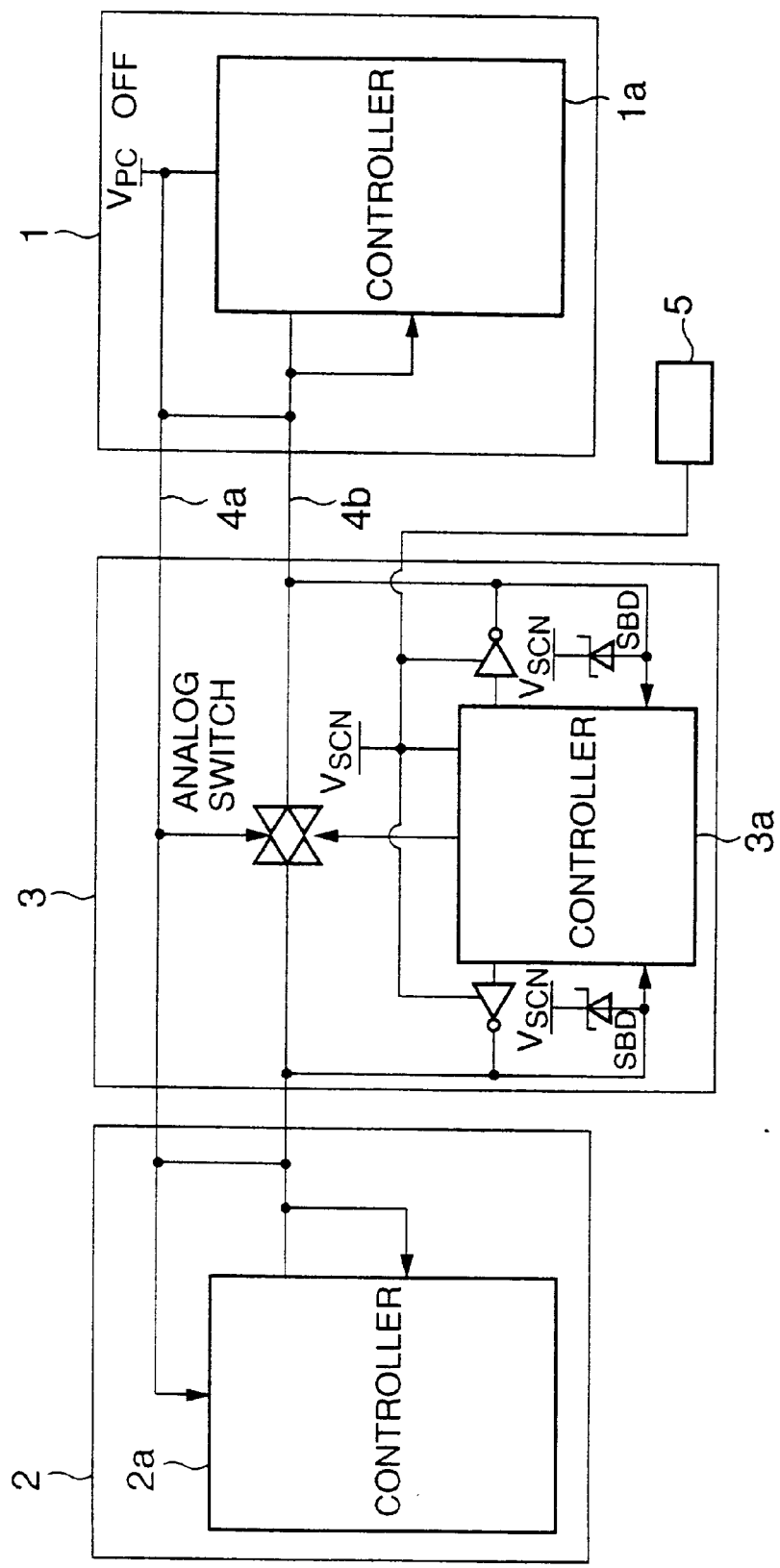
FIG. 7 is a block diagram showing internal structures of a keyboard interface circuit and protection circuits shown in FIG. 6.

It will first assume a case where the power supply to the personal computer 1 is turned ON, while the power supply to the bar code reader 3 is OFF. FIG. 7 shows the above case. Referring to FIG. 7, a signal is sent to the bar code reader 3 from the personal computer 1. When the level of the signal becomes high, the signal can be applied to the controller 3a of the bar code reader 3 because the keyboard interface circuit 3b is supplied with electricity from the personal computer 1 and is thus operating.

It should be noted that the latch-up occurs due to the fact that the voltage of the input signal is higher than the power supply voltage applied to the controller. On the other hand, the information processing device configured according to the embodiment of the present invention has the function of preventing the occurrence of the latch-up.

As shown in FIG. 6, two protection circuits 3c are provided between a power supply line 3d connected to the AC adapter 5 and the signal line 4b of the interface cable 4. The protection circuits 3c may be formed of Shottky barrier diodes (abbreviated SBD). Due to the function of the Shottky barrier diodes of the protection circuits 3c, part of the signal applied to the signal line 4b is applied to the controller 3a of the bar code reader 3. The two 1 protection circuits 3c operate in the same way as each other.

Figure 8:
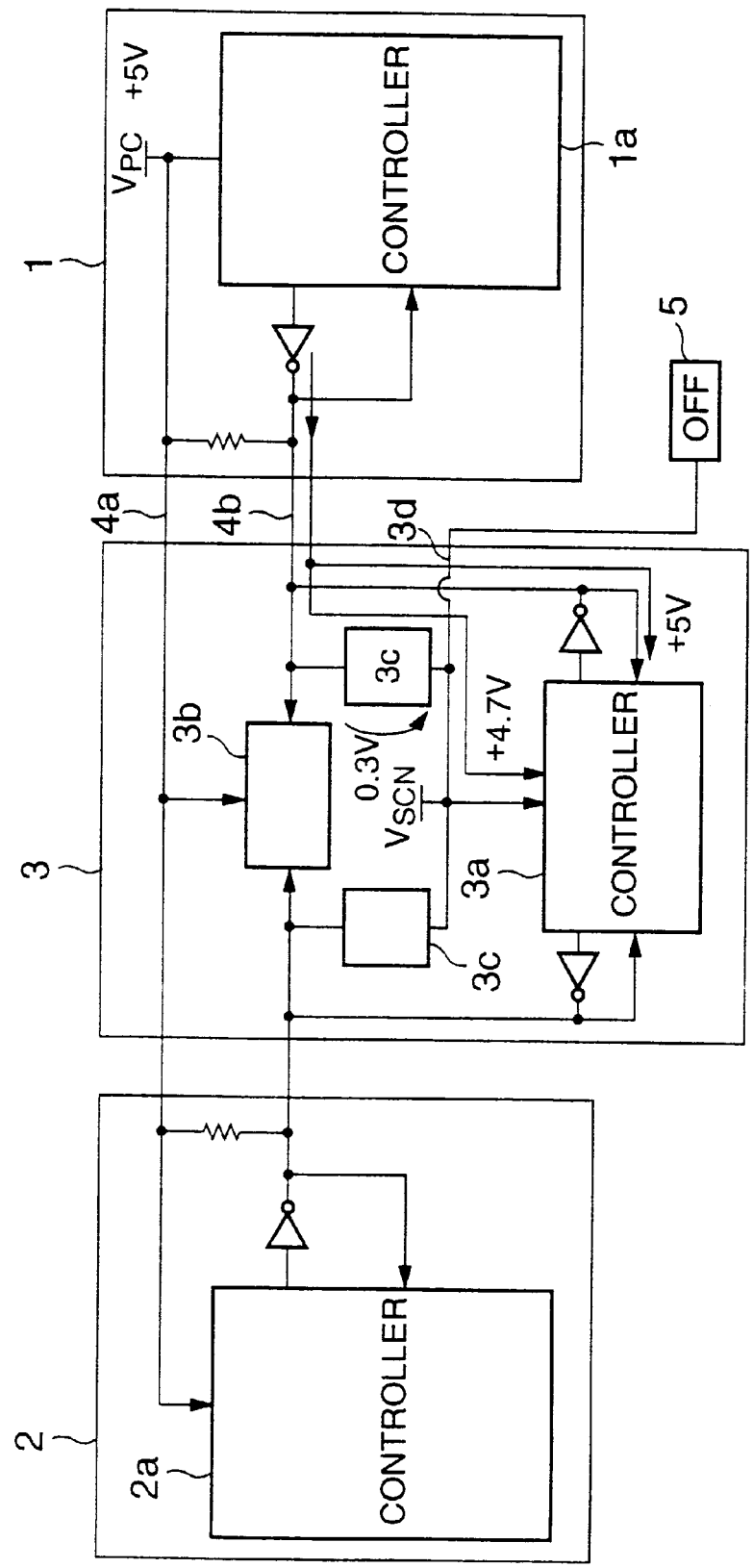
FIG. 8 is a block diagram showing an operation of the system.

As shown in FIG. 8, if the power supply voltage $V_{PC}$ of the personal computer 1 is equal to +5 V, the signal from the personal computer 1 is transferred over the signal line 4b, and is applied to the protection circuit 3c located on the right side in FIG. 8. Then, a voltage drop of approximately 0.3 V develops across the Schottky barrier diodes. Hence, a voltage of approximately 4.7 V is applied, as the power supply voltage $V_{SCN}$, to the controller 3a of the bar code reader 3. The voltage of the signal equal to 5 V is directly input to the controller 3a. Hence, the power supply voltage $V_{SCN}$ applied to the controller 3a is 0.3 V lower than the voltage applied to the controller 3a via the signal line 4b. The above voltage difference equal to 0.3 V caused by the Schottky barrier diode functions to prevent the latch-up from occurring in the CMOS circuit in the controller 3a.

As described above, it is possible to prevent the occurrence of the latch-up by applying, instead of the power supply voltage, part of the signal that is input to the keyboard interface circuit 3b via the signal line 4b to the controller 3a.

Another case will be assumed where the power supply to the bar code reader 3 is turned ON while no electricity is supplied to the personal computer 1.

In this case, the keyboard interface circuit 3b does not operate and is in the open state because the circuit 3b is supplied with no electricity from the personal computer 1 which is now OFF. If the signal of the bar code reader 3 switches to the high level (equal to +5 V), the above signal is not input to the personal computer I and the controller 2a of the keyboard 2. Hence, the latch-up does not occur in the controllers 1a and 2a of the personal computer 1 and the keyboard 2.

If the keyboard interface circuit 3b is in the operable state, the signal output from the controller 3a of the bar code reader 3 will be transmitted to the controller 1a of the personal computer 1 or the controller 2a of the keyboard 2. Hence, the latch-up may occur in the controller 1a or 2a.

The protection circuits 3c prevent the keyboard interface circuit 3b from being in the operable state in the above case, because the Schottky barrier-diodes of the protection circuits 3c do not allow the currents in flow therethrough in the reverse direction. Hence, in the case where the personal computer 1 is supplied with no electricity, the power supply voltage $V_{SCN}$ is not applied to the personal computer 1 via the signal line 4b.

As shown in FIG. 7, the keyboard interface circuit 3b may be formed by an analog switch, which is made up of a p-channel MOS transistor and an n-channel MOS transistor. The analog switch is controlled by the power supply line 4a. The analog switch may be controlled by the controller 3a. The keyboard interface circuit 3b can be formed by using MOS transistors in a formation other than the CMOS structure.

Figure 9:
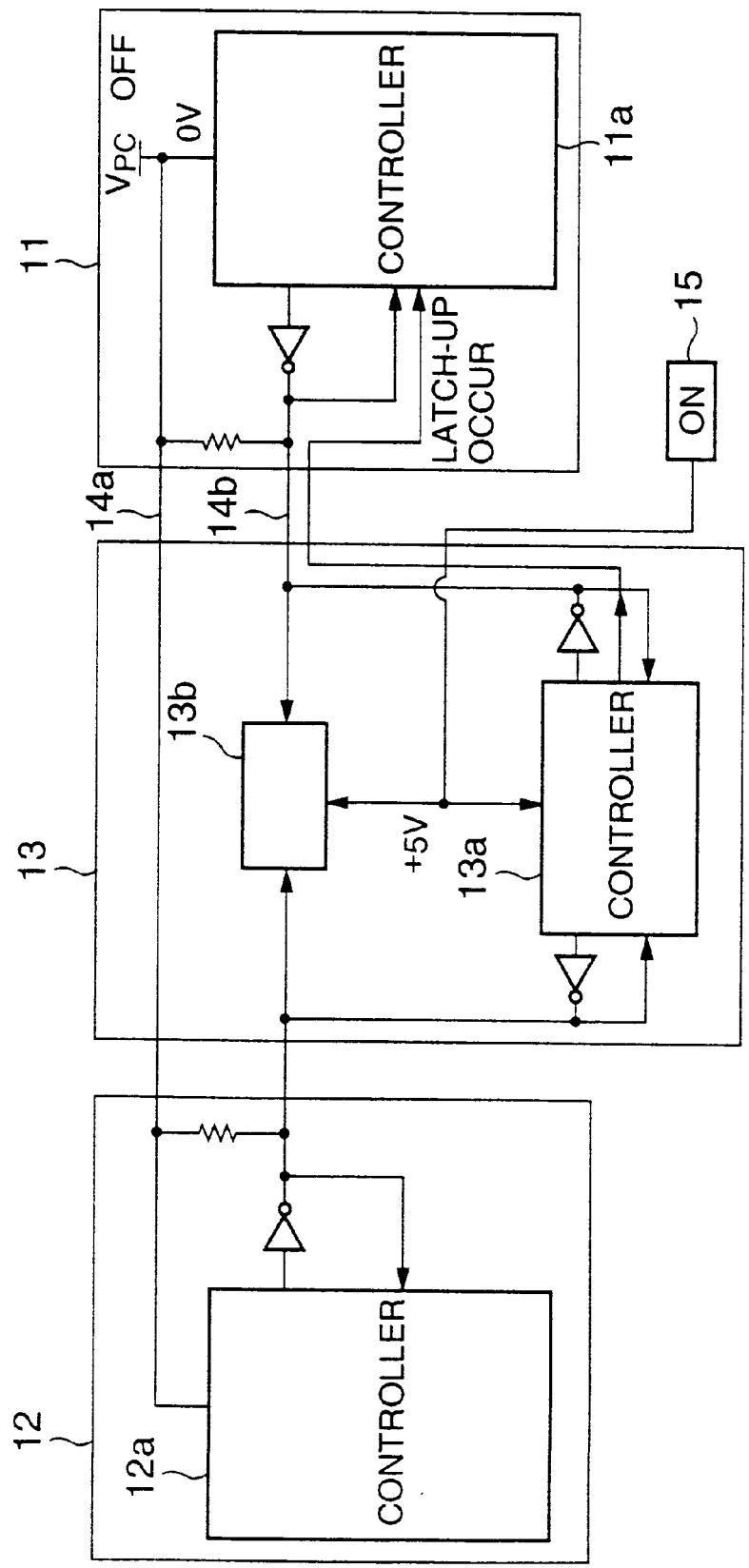
FIG. 9 is a block diagram of a comparative example.

FIG. 9 shows a comparative example. In the comparative example, electricity generated by the AC adapter 15 is supplied to the overall bar code reader 13. That is, the electricity from the AC adapter 15 is supplied to not only the controller 13a of the bar code reader 13 but also the keyboard interface circuit 13b thereof, which is thus in the operable state. Hence, the controller 11a can receive a signal form the bar code reader 13.

If the power supply voltage $V_{PC}$ is OFF, that is, no electricity is applied to the personal computer 11, a voltage of 0 V is applied to the controller 11a of the personal computer 11. In this case, the level of the signal applied to the controller 11a from the bar code reader 13 is higher than the power supply voltage equal to 0 V. Hence, the latch-up will occur in the controller 11a of the personal computer 11.

On the other hand, according to the present invention, the latch-up does not occur in the controller 1a of the personal computer 1 which is supplied with no electricity because the keyboard interface circuit 3b is in the open state.

The present invention is not limited to the specifically disclosed embodiment and variations and modifications may be made without departing from the scope of the present invention.

What is claimed is:

1. An information processing device connectable to another device via a transmission line, said information processing device comprising:

an interface circuit connected to the transmission line;

a circuit which sends a signal to the transmission line and receives a signal from the transmission line; and a protection circuit provided between a power supply line via which electricity is supplied to the circuit from an external power source and the transmission line, said interface circuit being supplied with electricity from said another device, and said protection circuit supplying said circuit with a part of the signal from the transmission line instead of the electricity supplied from the external power source.

2. The information processing device as claimed in claim 1, wherein said protection circuit comprises an element which conducts in a first direction from the transmission line to the power supply line and which does not conduct in a second direction from the power supply line to the transmission line.

3. The information processing device as claimed in claim 1, wherein said interface circuit includes an analog switch.

4. The information processing device as claimed in claim 1, wherein said circuit is supplied with electricity from an external power source connected to the information processing device, wherein said information processing device further comprises a protection circuit provided between a power supply line via which the electricity is supplied to the circuit from the external power source and the transmission line, and wherein said protection circuit conducts in a first direction from the transmission line to the power supply line and which does not conduct in a second direction from the power supply line to the transmission line.

5. A system comprising:

a first device, and a second device which communicates with the first device via a transmission line, said first device comprising:

a circuit which sends a signal to the transmission line and receives a signal from the transmission line, said circuit being supplied with electricity from an external power source; and a protection circuit supplying said circuit with a part of the signal from the transmission line instead of the electricity supplied from the external power source.

6. A bar code reader comprising:

a circuit which sends a signal to a transmission line and receives a signal therefrom, said circuit being supplied with electricity from an external power source; and a protection circuit supplying said circuit with a part of the signal from the transmission line instead of the electricity from the external power source.

* * * * *